US007567417B2

(12) United States Patent
Groth et al.

(10) Patent No.: US 7,567,417 B2
(45) Date of Patent: Jul. 28, 2009

(54) AUTOMATICALLY QUENCHING SURGE ARRESTER ARRANGEMENT AND USE OF SUCH A SURGE ARRESTER ARRANGEMENT

(75) Inventors: Siegfried Groth, Pfäffikon (CH); Uhland Goebel, Wila (CH); Peter Nüchter, Stein (CH); Markus Ganter, Fehraltorf (CH)

(73) Assignee: Huber+Suhner AG, Herisau (CH)

( * ) Notice: Subject to any disclaimer, the term of this patent is extended or adjusted under 35 U.S.C. 154(b) by 111 days.

(21) Appl. No.: 11/659,521

(22) PCT Filed: Aug. 6, 2004

(86) PCT No.: PCT/CH2004/000495

§ 371 (c)(1),
(2), (4) Date: Feb. 5, 2007

(87) PCT Pub. No.: WO2006/012754

PCT Pub. Date: Feb. 9, 2006

(65) Prior Publication Data

US 2007/0253136 A1 Nov. 1, 2007

(51) Int. Cl.
*H02H 1/00* (2006.01)

(52) U.S. Cl. ........................ 361/131; 361/124; 361/127

(58) Field of Classification Search ................. 361/124, 361/127, 131

See application file for complete search history.

(56) References Cited

U.S. PATENT DOCUMENTS 3,755,715 A 8/1973 Klayum et al.
4,051,546 A 9/1977 Scheithauer
4,068,277 A 1/1978 Simokat
4,132,915 A 1/1979 Wilms
4,275,432 A 6/1981 Napiorkowski
4,288,833 A * 9/1981 Howell ....................... 361/124
4,503,414 A * 3/1985 Sykes et al. .................... 337/31
5,224,008 A * 6/1993 Popat et al. ................... 361/56
5,718,593 A * 2/1998 Figueiredo et al. ......... 439/76.1
5,986,870 A * 11/1999 Kapp ......................... 361/127
6,411,487 B1 * 6/2002 Rawlings et al. ............ 361/124
6,724,605 B1 * 4/2004 Boy et al. ................... 361/120
7,023,680 B1 * 4/2006 Johnson et al. ............. 361/111
2005/0206493 A1 * 9/2005 Chan et al. ..................... 338/21

FOREIGN PATENT DOCUMENTS

CH 660 261 A5 3/1987
DE 197 31 312 A1 1/1999

(Continued)

*Primary Examiner*—Ronald W Leja
*Assistant Examiner*—Christopher J Clark
(74) *Attorney, Agent, or Firm*—The Webb Law Firm

(57) ABSTRACT

The invention relates to an automatically quenching surge arrester arrangement with a surge arrester, which, on exceeding a given first voltage, transforms from a non-conducting into a conducting state and returns to the non-conducting state only when a much smaller second voltage is dropped below and with a switch mechanism reacting to current flow through the surge arrester, interrupting the current flow through the surge arrester and then automatically returning to the rest condition thereof. A simple, robust and compact assembly suitable for HF applications for such a surge arrester arrangement is achieved, whereby the switch mechanism reacts reversibly to the heat generated in the surge arrester by the current flow.

19 Claims, 5 Drawing Sheets

FOREIGN PATENT DOCUMENTS

| | | | | |
|---|---|---|---|---|
| EP | 0 855 756 | A1 | | 7/1998 |
| EP | 0 938 166 | A1 | | 8/1999 |
| FR | 2 763 438 | | | 11/1998 |
| FR | 2 848 353 | | | 6/2004 |
| JP | 2004320857 | A | * | 11/2004 |
| WO | WO 2004/032276 | | | 4/2004 |

* cited by examiner

AUTOMATICALLY QUENCHING SURGE ARRESTER ARRANGEMENT AND USE OF SUCH A SURGE ARRESTER ARRANGEMENT

BACKGROUND OF THE INVENTION

1. Field of Invention

The present invention relates to the field of electrical protection. It relates in particular to an automatically quenching surge arrester arrangement as claimed in the preamble of claim 1, and to the use of a surge arrester arrangement such as this.

2. Description of Related Art

Lightening strikes or other brief phenomena can result in dangerous voltage spikes occurring in electrical and electronic circuits, or on electrical cables, which are connected to exposed apparatuses such as radio antennas, and these can lead to permanent damage to the electrical devices or to a total failure. In order to render such voltage spikes safe, surge arresters of various designs and methods of operation have for a very long time been installed at suitable points on the device to be protected, which are non-conductive in normal circumstances but are switched through when dangerous overvoltages occur, equalizing out the potential differences that occur.

One possible type of surge arrester is formed by voltage-dependent resistors, for example metal-oxide varistors (MOVs), which are connected between two conductors between which dangerous voltage spikes can occur. At normal operating voltages, the resistance of the varistors is high, so that only a small leakage current flows between the two conductors. When high voltage spikes occur, the resistance of the varistors decreases drastically, so that the desired equalization current can flow. However, problems result in the case of varistors when greatly increased leakage currents flow in them even in normal conditions as a result of internal changes, which load the circuit to be protected and can lead to changes in their operation. It has therefore already been proposed for a switching device which can be activated thermally to be connected in series with a varistor, which interrupts the current through the varistor as the varistor is heated as a result of a major leakage current, and, as a substitute for this, introduces a spark gap as additional overvoltage protection into the disconnected connection (U.S. Pat. No. 4,288,833). The switching device which can be activated thermally is provided by an elastic switching arm which is soldered by one end to the varistor such that it is mechanically prestressed, and which produces an electrical connection to the varistor. When the varistor is heated severely as a result of excessive leakage currents, the solder of the soldered joint melts, and the electrical switching arm is lifted off the varistor by its prestressing, interrupting the current flow through the varistor. As the switching arm is lifted off, a spark gap comes into effect, which is formed between the varistor and the raised switching arm or conductor tips which are provided specifically for this purpose. This surge arrester arrangement has the disadvantage that the change in the arrangement when the switching device is triggered is irreversible. The switching process of the surge arrester which is provided with an external short-circuit device, from the document DE-A1-197 31 312 is also irreversible, in the same way. If the surge arrester is heated excessively, two insulating spacers melt, so that an elastically prestressed short-circuiting bracket can short the two or three connecting contacts of the surge arrester and can thus take over the current flow through the surge arrester.

Another type of surge arrester is formed by gas capsule arresters, in which an overvoltage results in a gas discharge being triggered in a closed gas-filled capsule with two or three electrodes. These arresters are subject to the problem that, once a gas discharge has been triggered, it is maintained at a comparatively low burning voltage. If, for example, a supply voltage for remote electronics which is greater than or equal to the burning voltage, or a high RF power, is applied during normal operation to the gas capsule arrester which is installed in a circuit or cable, the gas discharge continues to burn after the occurrence of a triggering overvoltage spike, and loads the circuit or cable. Additional irreversible switching devices have also already been proposed for gas capsule arresters, which react to excessive heat being created in the arrester and then permanently interrupt the current supply to the arrester (U.S. Pat. No. 4,051,546) or permanently short the arrester by means of a bypass (U.S. Pat. Nos. 3,755,715 or 4,132,915). The thermally activated switching devices can be integrated in the surge arrester (see the abovementioned documents), although they could also be formed separately and can be thermally coupled to the surge arrester from the outside (U.S. Pat. No. 4,275,432). Thermally activated, irreversible shorting devices are also known in conjunction with gas capsule arresters for coaxial cables (U.S. Pat. No. 5,724,220, FIGS. 24 and 25).

A reversible switching device for interruption of the discharge current through a gas capsule arrester is known from U.S. Pat. No. 4,068,277. In this case, a separate contactor is provided, which is equipped with a bimetallic element, operates thermally and whose heating element is connected in series with the arrester. If a discharge, once it has been triggered, remains in existence for a certain time in the arrester, the contactor trips and interrupts the current through the arrester and one line. Once the contactor has cooled down again sufficiently after a relatively long time of, for example, 20-30 seconds, it automatically reconnects the current through the arrester and the one line, thus restoring the initial state. This solution has the disadvantage that a compact and space-saving arrangement is not possible, because of the separate contactor. Furthermore, interruption in one line is unsuitable for applications in which a supply current for other circuit parts is passed via the lines.

Surge arrester arrangements which are integrated in a coaxial conductor arrangement for radio frequencies and therefore have to be suitable not only for very high frequencies but should furthermore also be physically compact, functionally reliable, robust and requiring little maintenance, are subject to particular requirements.

Examples of coaxial conductor arrangements with an integrated surge arrester arrangement but without any additional switching device are disclosed in CH-A5-660 261, EP-A1-0 855 756, or EP-A1-0 938 166 from the same applicant. In order to allow the gas capsule arresters to be reliably switched to the non-conductive state even when a DC voltage or a radio-frequency signal is applied, in the case of a defect with surge arrester arrangements such as these, WO-A1-2004/032276 from the same applicant proposes an additional switching arrangement, which comprises an inductance, an electromagnetically operated interrupter switch, and a diode. This switching arrangement interacts with a series circuit comprising two identical gas capsule arresters. The configuration and method of operation of the arrangement can be found in the cited document.

The switching arrangement which is known from WO-A1-2004/032276 protects the gas capsule arrester reliably against continuous loading, and is automatically reconnected after quenching of the gas discharge in the gas capsule arresters. This arrangement has been proven in practice and can be integrated in coaxial conductor arrangements provided that they are designed from the start for this purpose.

However, there is an urgent need to have an automatically quenching surge arrester arrangement which can be used in particular over a broad bandwidth, is of simple design and can be produced at low cost, but which can also be retrofitted to existing coaxial conductor arrangements with an integrated surge arrester, as described in CH-A5-660 261, without having to make any physical modifications to the coaxial conductor arrangement itself.

SUMMARY OF THE INVENTION

The object of the invention is thus to create an automatically quenching, broad bandwidth and low-cost surge arrester arrangement, which is of simple and robust design, is highly functionally reliable, can be implemented in an extremely space-saving manner, and in particular can be retrofitted to existing coaxial conductor applications without physical modifications.

The essence of the invention is to provide a switching mechanism which responds reversibly to the heat which is produced by the current flow through the surge arrester when a current flows through the surge arrester and interrupts the current flow through the surge arrester, and then automatically returns to its initial state again. In the simplest case, this can be achieved by purely electronic means, for example by using a resistor with a positive temperature coefficient (PTC) or a negative temperature coefficient (NTC) to monitor the heat in the surge arrester, and to interrupt the gas discharge as a result of its change in resistance.

The switching mechanism preferably has switching means as well as operating means, which are thermally coupled to the surge arrester, for operation of the switching means, which operating means—in contrast to the melting soldered joints from the prior art—respond reversibly to the heat which is produced by the current flow through the surge arrester. The direct thermal coupling of the operating means to the surge arrester allows the two to be physically combined, thus resulting in a very compact arrangement. The response of the operating means to the heat which is produced in the surge arrester ensures that the interruption is carried out with a certain delay and only when the arrester is actually subject to a continuous load. When the heating of the arrester decays again after the interruption of the current flow through the surge arrester, the operating means automatically return to their initial state, so that the surge arrester arrangement is ready for use again after a certain time delay.

By way of example, memory metals or bimetallic strips may be used as the operating means, which change their shape as a result of being heated and either operate separate switching means or are themselves part of the switching means. One preferred refinement of the invention is distinguished in that the operating means have expansion means which convert the heat produced by the current flow in the surge arrester to a switching movement, by means of thermal expansion. The thermal expansion is a particularly simple, effective, functionally reliable and reproducible mechanism for the production of a switching movement, by means of which the current flow through the arrester can then be interrupted. When the surge arrester subsequently cools down again, the expansion is followed by a contraction, which returns it to the initial state.

In principle, the thermal expansion of a gas, of a liquid or of a solid can be used. For simplicity and robustness, it is particularly advantageous, according to one preferred development, for the expansion means to have an expansion body composed of a solid material, whose thermal expansion on a first axis is used as a switching movement. This results in a linear switching movement which can be combined particularly easily with appropriate switching means. In particular, in this case, the thermal expansion of the expansion body on the first axis can be amplified by suitable shaping of the expansion body or by the expansion body material having an anisotropic behavior. One example of suitable shaping is an angled shape in the form of a toggle lever (acting in the opposite direction).

The expansion body is preferably composed of a heat-resistant rubber-elastic material, in particular a silicone rubber or a fluoroelastomer, and the expansion body is preferably surrounded by a limiting element, which limits the radial expansion, and thus amplifies the axial expansion. The limiting body limits the thermal expansion radially with respect to the first axis, and results in considerable amplification of the expansion in the direction of the first axis as a result of the "quasi-hydrostatic" behavior of the expansion body.

If, according to one development, the expansion body is in the form of a circular disk which is axial with respect to the first axis, and a hollow-cylindrical, coaxial, electrically and thermally insulating insulator sleeve, in particular composed of polytetrafluoroethylene, is provided as the limiting element, this makes it possible to prevent the heat which has flowed into the expansion body flowing away which is not wanted, as a result of the lateral limit.

In principle, the current flow through the surge arrester can be interrupted by opening a series-connected switch or by closing a parallel-connected switch. The design of the surge arrester arrangement is particularly simple and compact if the switching means have a switch which is connected in series with the surge arrester and is closed in the initial state, and which is opened when the operating means respond to the heat which is produced by the current flowing through the surge arrester. However, it is also feasible within the scope of the invention for the switching means to have a switch which is connected in parallel with the surge arrester and is open in the initial state, and which is closed when the operating means respond to the heat which is produced by the current flow through the surge arrester.

The switch preferably has two metallic contact elements, which are pressed against one another by a spring element and can be disconnected from one another against the pressure of the spring element, with one of the contact elements being connected to the surge arrester arrangement, in particular being soldered to it, and with the operating means and/or the expansion means being arranged between the two contact elements. The contact elements are surface-treated in order to prevent wear, in particular by being coated with silver.

The surge arrester arrangement is very simple and is particularly suitable for use in coaxial radio-frequency cables when the surge arrester, the metallic contact elements, the spring element and the operating means and/or the expansion means are arranged one behind the other axially with respect to a first axis in a common housing, when the housing is electrically conductive and is used as a supply line to the surge arrester, and when contact springs are provided in order to make the contact with the housing.

The metallic contact elements, the spring element and the operating means and/or the expansion means may in this case be arranged on one side of the surge arrester.

However, the metallic contact elements and the operating means and/or the expansion means can also be arranged on one side of the surge arrester, with the spring element being arranged on the other side of the surge arrester.

The housing may be in the form of a housing which is open on one side and can be screwed in. However, it is also feasible for the housing to be in the form of a housing which is open on one side, and for connecting pins for insertion of the surge arrester arrangement into a printed circuit to be provided on the open side of the housing.

The surge arrester is preferably in the form of a gas capsule arrester and has a cylindrical shape with electrical connections arranged on the end faces.

According to the invention, a surge arrester arrangement in which the surge arrester, the metallic contact elements, the spring elements and the operating means and/or the expansion means are arranged one behind the other coaxially with respect to a first axis in a common housing, in which the housing is electrically conductive and is used as a supply line to the surge arrester, and in which contact springs are provided in order to make the contact with the housing, is used in a coaxial conductor arrangement.

In particular, the coaxial conductor arrangement has an inner conductor which runs on a second axis and an outer conductor which coaxially surrounds the inner conductor, with the surge arrester arrangement being attached to the coaxial conductor arrangement with the first axis at right angles to the second axis, in particular being screwed to it, and with the housing being electrically conductively connected to the outer conductor, and with a second supply line to the surge arrester being electrically conductively connected to the inner conductor.

Further embodiments are specified in the dependent claims.

BRIEF DESCRIPTION OF THE DRAWINGS

The invention will be explained in more detail in the following text with reference to exemplary embodiments and in conjunction with the drawing, in which.

DETAILED DESCRIPTION OF THE PRESENT INVENTION

Figure 1:
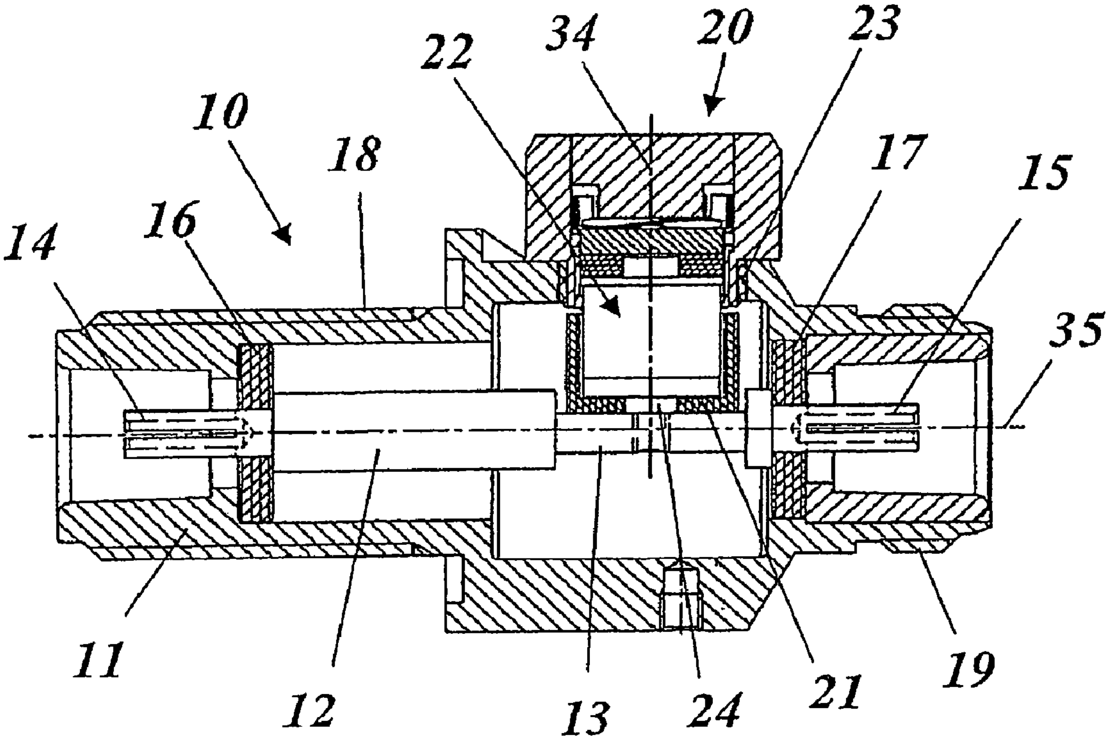
FIG. 1 shows a longitudinal section through a coaxial conductor arrangement having a screwed-in surge arrester arrangement according to one preferred exemplary embodiment of the invention.

FIG. 1 shows a longitudinal section through a coaxial conductor arrangement having a screwed-in surge arrester arrangement according to one preferred exemplary embodiment of the invention. The configuration and external dimensions of the coaxial conductor arrangement 10 shown in FIG. 1 are comparable to those of known gas capsule lightening-protection devices, such as those which are marketed by the same applicant and are used in particular in mobile radio base stations. Gas capsule lightening-protection devices such as these normally have an impedance of 50 Ω, can be used for frequencies up to several GHz, and can be loaded with single current pulses up to 30 kA and with multiple current pulses up to 20 kA. Typical external dimensions are axial lengths of 100 mm and external diameters of about 30 mm. The invention allows gas capsule lightening-protection devices such as these to be fitted retrospectively with a switching device which is suitable for self-quenching, without any need to carry out significant modifications.

The coaxial conductor arrangement 10 has a metallic outer conductor 11 (made from surface-treated brass or the like) which is used as a housing at the same time and has a stepped internal diameter, and an inner conductor which is composed of a plurality of inner conductor sections 12, . . . , 15. The inner conductor 12, . . . , 15 is arranged and fixed coaxially in the outer conductor 11 by means of insulating holders 16, 17 in the form of disks. The inner conductor sections 14 and 15 at the ends are in the form of slotted bushes and are part of screw-type plug connections. The outer conductor 11 has external threads 18, 19 on it for screw connection. The outer conductor 11 and its internal diameter are enlarged in a central section of the coaxial conductor arrangement 10. An inner conductor section 30 with a reduced external diameter is provided at the same time in this section. A threaded hole 23 is incorporated on one side (at the top in FIG. 1) in the outer conductor and/or the housing 11 at right angles to the axis 35 of the coaxial conductor arrangement 10, and a surge arrester arrangement 20 according to the invention can be screwed into this threaded hole 23.

The surge arrester arrangement 20 contains a (cylindrical) surge arrester 22 which is known per se and is in the form of a two-pole gas capsule arrester or gas discharge arrester, whose cylinder axis is located on the axis 34 of the surge arrester arrangement 20. Gas discharge arresters such as these, available for example from the Epcos Company, have response voltages from 70 V to several kV, and have an arc burning voltage of 10-30 V in the triggered state. The internal resistance in the triggered state falls to values of <1 Ω while in the blocked state (quenched state) it is >1 GΩ. The capacitance is only a few pF, and this is particularly advantageous for RF applications. The external dimensions (length×external diameter) are in the order of magnitude of 6 mm×8 mm.

The surge arrester 22 is held detachably in the surge arrester arrangement 20, and has two contact surfaces at the end, which are connected to the internal gas discharge path and are isolated from one another by the ceramic housing in between. The lower free end of the surge arrester 22 is seated in an insulating cup 21. Its lower contact surface rests on an electrically conductive connecting piece 24, which makes contact with the inner conductor section 13 through a hole in the bottom of the insulating cup 21.

Figure 2:
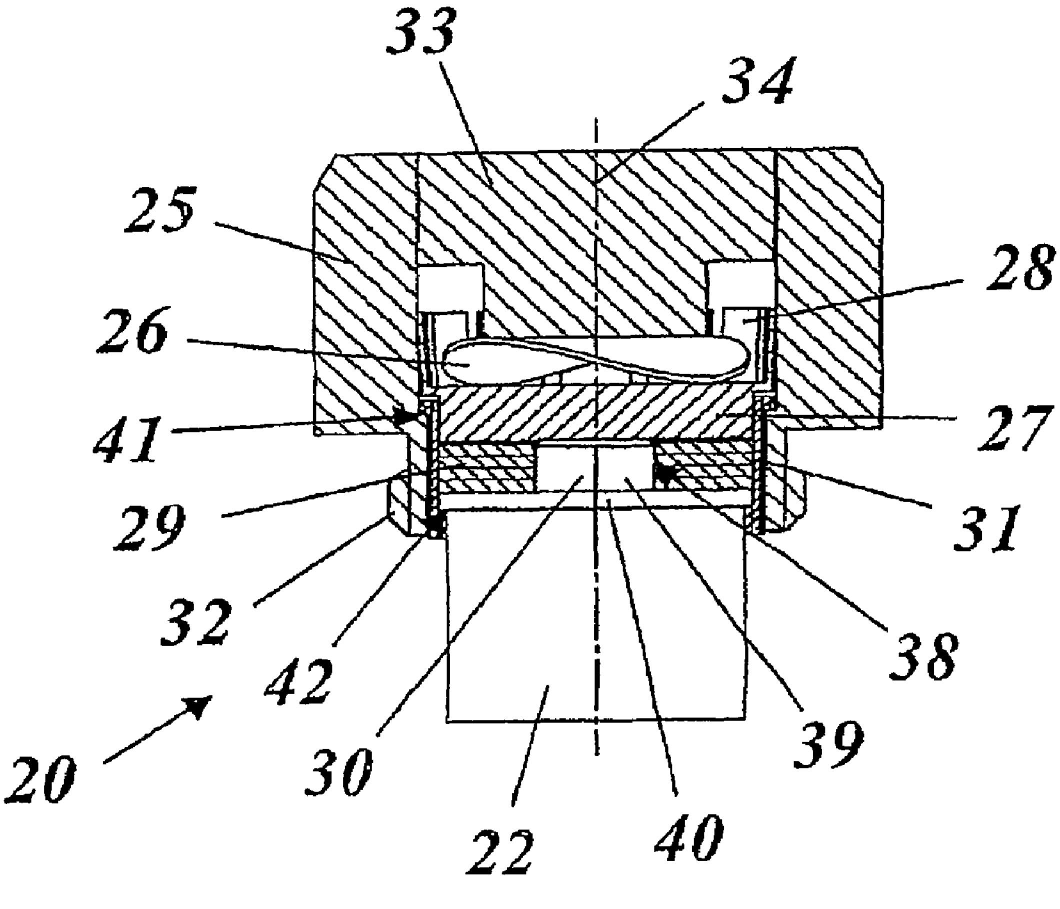
FIG. 2 shows the configuration of the surge arrester arrangement from FIG. 1, fitted with a gas capsule.

The surge arrester arrangement 20 illustrated in FIG. 1 is shown enlarged in FIG. 2 in its own right. This has a housing 25 which is open at the bottom and holds the surge arrester or gas capsule arrester 22 (capsule holder housing). On the outside, the housing 25 is provided with key surfaces and has a screw thread 32, by means of which it can be screwed into the threaded hole 23 in the outer conductor 11 (FIG. 1). Initially, the housing 25 is also designed to be open on the other side, in order that the functional elements 22 and 26, . . . , 31 accommodated in the housing can be introduced into the interior of the housing. A bolt 33 is then used to (permanently) close the upper opening.

The surge arrester 22, a center contact 30, an expansion body 29, a contact disk 27 with contact springs 28 (which are fitted at the edge on the upper circumference and project upwards) and a spring element 26 in the form of a spring washer are arranged one behind the other—from the bottom upwards—along the axis 34 of the surge arrester arrangement 20 in the housing 25. The center contact 30 has a base plate 40 in the form of a circular disk, on which a cylindrical contact bolt 39 with reduced diameter is integrally formed pointing upwards. The external diameter of the base plate 40 is somewhat larger than the external diameter of the surge arrester 22.

By way of example, the center contact 30 is composed of brass and is surface-treated, in particular by being coated with silver, in order to improve the contact characteristics and, in particular, in order to prevent wear.

The expansion body 29 is in the form of a circular disk and is preferably composed of a heat-resistant, rubber-elastic material, in particular a silicone rubber or a fluoroelastomer. In the center, it has a coaxial hole 38, whose diameter is matched to that of the contact bolt 39 of the center contact 30. In the assembled state (FIG. 2) the center contact 30 with the contact bolt 39 actually passes through the hole 38 in the expansion body 29 to such an extent that, at the operating temperature, the end surface of the contact bolt 39 is adjacent to and flush with the upper face of the expansion body 29, and at the same time makes an electrical contact with the lower face of the contact disk 27, which is arranged above the expansion body 29.

The circular contact disk 27 is likewise composed of surface-treated, in particular silver-plated, brass. The contact springs 28 which are fitted, distributed over the circumference, to the upper edge of contact disk 27, extend in the axial direction and are bent slightly outwards, make a sliding contact with the inner wall of the housing 25. The housing 25 is at the same time used as a supply line to the surge arrester 22. In order to prevent the center contact 30 and the contact disk 27 from being shorted via the housing 25, the center contact 30 is surrounded on the outside by a coaxial insulator sleeve 31, which also surrounds the expansion body 29 and the lower part of the contact disk 27. The insulator sleeve 31 is in the form of a hollow cylinder and is composed of an electrically and thermally insulating, heat-resistant material, preferably of polytetrafluoroethylene. The insulator sleeve 31 has an outer projection 41 which engages behind an undercut in the housing 25. The center contact 30 with the base plate 40 is itself supported on an undercut 42 in the insulator sleeve 31. The surge arrester 22, whose upper contact surface is soldered to the base plate 40 of the center contact, is thus held in the housing 25.

A spring element 26 is arranged between the upper face of the contact disk 27 and the housing 25 or the bolt 34 and, in the illustrated example, is in the form of a spring washer, although it may also assume different shapes (cup spring, spiral spring or the like). The spring element 26 and the axial dimensions of the individual components of the surge arrester arrangement 20 are designed such that the contact bolt 39 and the contact disk 27 are pressed against one another, such that they make contact, by spring pretension in the normal state (at the operating temperature).

The surge arrester arrangement 20 operates as follows: In the normal state, when the surge arrester 22 has not been triggered and the arrangement is essentially at the operating temperature, the switching contact which is formed by the center contact 30 and the contact disk 27 remains closed. The surge arrester 22 is thus electrically conductively connected at its first end to the inner conductor section 13, and at its other end via the elements 30, 27, 28 and the housing 25, to the outer conductor 11. If a lightening strike or some other brief voltage pulse which is greater than the triggering voltage of the surge arrester 22 is now applied to the coaxial conductor arrangement 10, the surge arrester 22 is triggered, and the potential difference is largely equalized. When the voltage falls, after the voltage pulse has decayed, back below the burning voltage of the surge arrester 22, the latter is quenched, and resumes the initial state. There is no significant heating of the surge arrester 22 and thus of the expansion body 29. If, in contrast, a voltage which is above the burning voltage still remains on the surge arrester 22 even after the voltage pulse has decayed, with currents still flowing through the surge arrester 22, this current produces heat as a result of the internal resistance of the arrester, leading to heating of the surge arrester 22. The heat which is created in the surge arrester 22 flows axially via the base plate 40 and radially via the contact bolt 39 of the center contact 30 into the expansion body 29., heats the latter and results in thermal expansion with a rapid radial outflow of the heat into the housing 25 being prevented by the thermally insulating insulator sleeve 31. In this case, the thermal expansion of the expansion body 29 takes place virtually exclusively in the axial direction, because the expansion body 29 is bounded by the insulator sleeve 31 in the radial direction and the pressure which is created by this constriction acts in the axial direction owing to the "quasi-hydrostatic" material characteristics of the expansion body 29. This results in the expansion body 29 expanding axially by more than 3 times the isotropic expansion, thus representing a considerable amplification effect. Provided that a sufficiently high temperature of, for example, 100° C. or more has been reached, the axial thermal expansion of the expansion body 29 between the two contacts 30 and 37 results in the two contacts being disconnected from one another, against the pressure of the spring element 26. When the contacts 30 and 27 are disconnected, the current flow through the surge arrester 22 and thus also the heat that is produced are interrupted (self-quenching). As soon as sufficient heat has flowed out of the expansion body 29 again after the interruption and the expansion body 29 has cooled down and contracted again, the switch which is formed from the center contact 30 and the contact disk 27 is closed again, and returns to the initial state.

It is self-evident that the described switching process operates better the greater the thermal coefficient of expansion of the material used for the expansion body 29. At the same time, however, the material should also be thermally resistant up to temperatures >200° C. and should have sufficient resistance to ageing. Finally, it should also have advantageous dielectric characteristics for use in the coaxial cable arrangement. The dielectric characteristics of the expansion body 29 are particularly important when the aim is to retrospectively install a switching device such as this in a coaxial lightening-protection device which is equipped with a surge arrester without a self-quenching switching device, as is advantageously possible in the case of the surge arrester arrangement according to the invention.

Various measurements have been carried out in the laboratory with a coaxial conducting arrangement and a surge arrester arrangement as shown in FIG. 1, using gas capsule arresters of the type described above with triggering voltages of 230 V and 90 V. Pulses of 4 kV/2 kA (in accordance with IEC 61000-4-5) resulted in capsule burning times in the order of magnitude of 10 s to 20 s, and reactivation times in the order of magnitude of 1-2 minutes.

Figure 3:
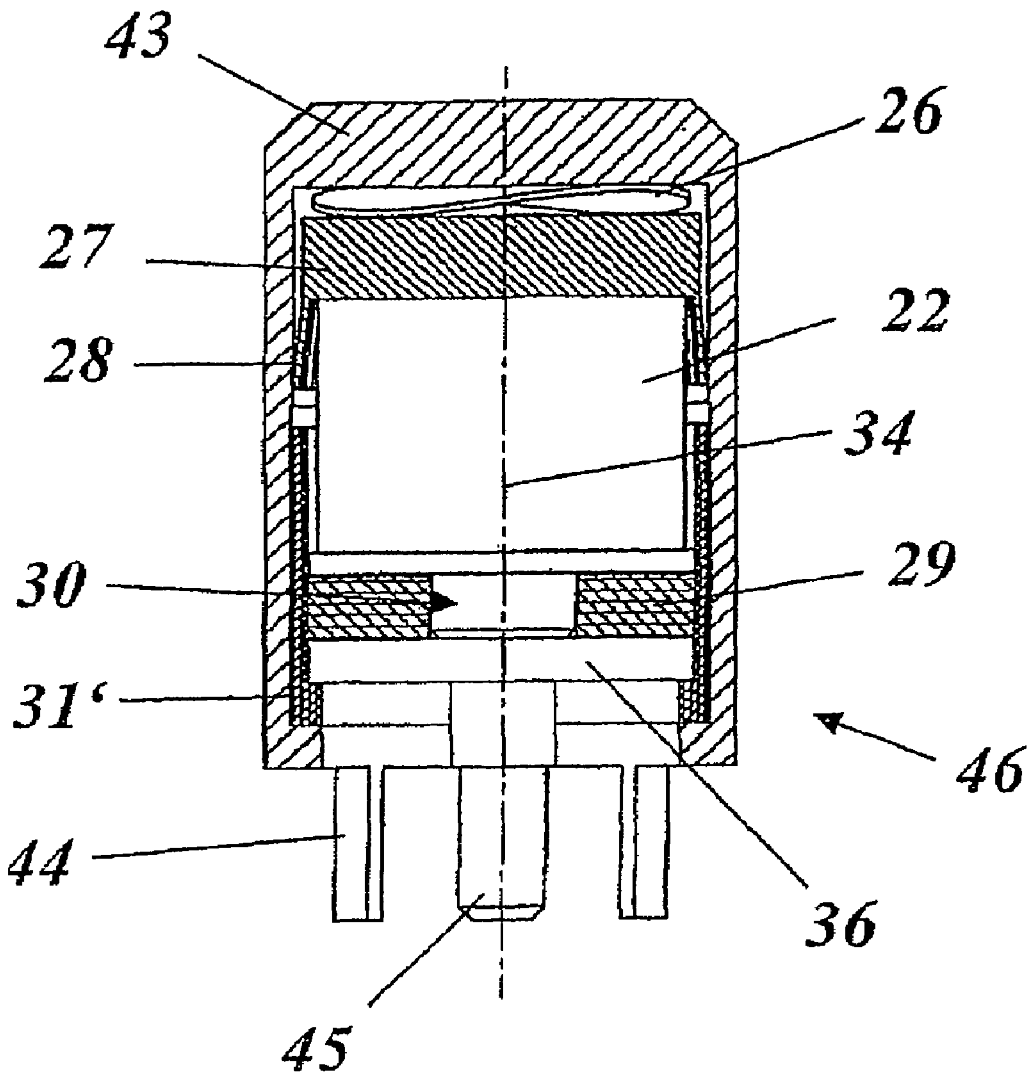
FIG. 3 shows a surge arrester arrangement according to another exemplary embodiment of the invention, which is suitable for installation in a printed circuit.

However, the surge arrester arrangement according to the invention may not only be advantageously used in conjunction with a coaxial conductor arrangement of the type shown in FIG. 1, but can also be used whenever gas capsule arresters are used for over voltage protection. For example, it is normal practice to solder gas capsule arresters which are equipped with connecting wires or solder pins (see DE-A1-197 31 312) into printed circuits. FIG. 3 shows a comparable surge arrester arrangement that has been modified according to the invention. The surge arrester arrangement 46 in FIG. 3 has a surge arrester 22 in the form of a gas capsule, which is accommodated in a housing 43 which is open on one side. The series-connected switching device in turn comprises the center contact 30, which is soldered to the capsule 22, the expansion body 29, which is in the form of a disk, and a contact plate

36, and these items are isolated from the housing 43 by an insulation sleeve 31'. The switching device is in this case arranged underneath the surge arrester 22, while the contact springs 28 with the contact disk 27 are located above the surge arrester 22. On one side (at the bottom), the surge arrester 22 is connected via central connecting means 45 and the switch 30, 36. On the other side (at the top), the connection is provided via the outer connecting means 44, the housing 43 and the contact disk 27 with the contact springs 28. The connecting means 44, 45 can advantageously be used for connection of the surge arrester arrangement 46 in a printed circuit.

Figure 4:
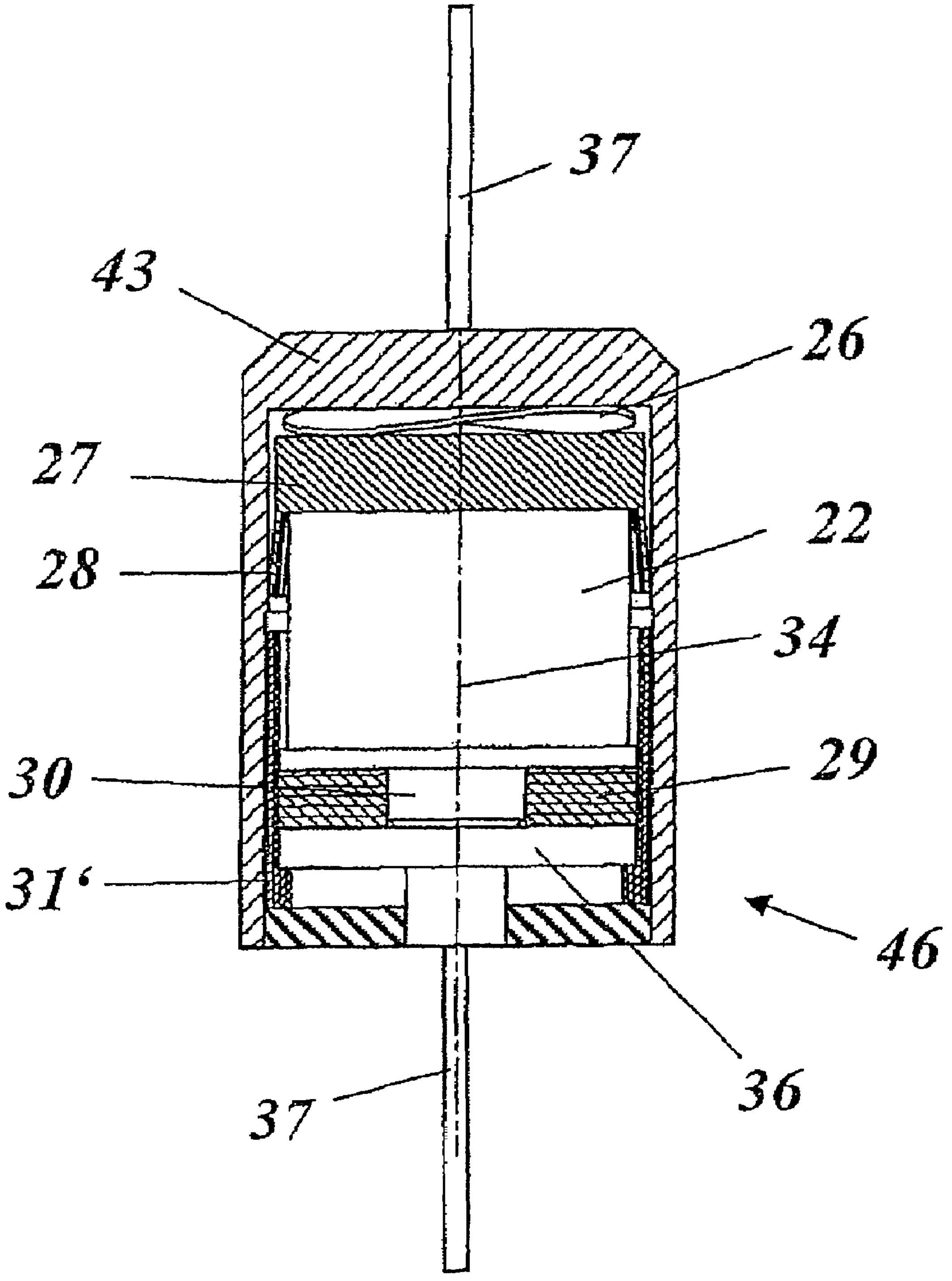
FIG. 4 shows an exemplary embodiment, comparable to FIG. 3, with axial connecting wires for "flowing" wiring.

However, it is also feasible within the scope of the invention in the case of a surge arrester arrangement of the type illustrated in FIG. 3 to provide axial (or also radial) connecting wires 37 on both sides, instead of the connecting means 44, 45 arranged on one side, as is shown in FIG. 4. The surge arrester arrangement 46 can thus be provided with "flowing" wiring, that is to say it can be installed in any desired circuit.

Figure 5:
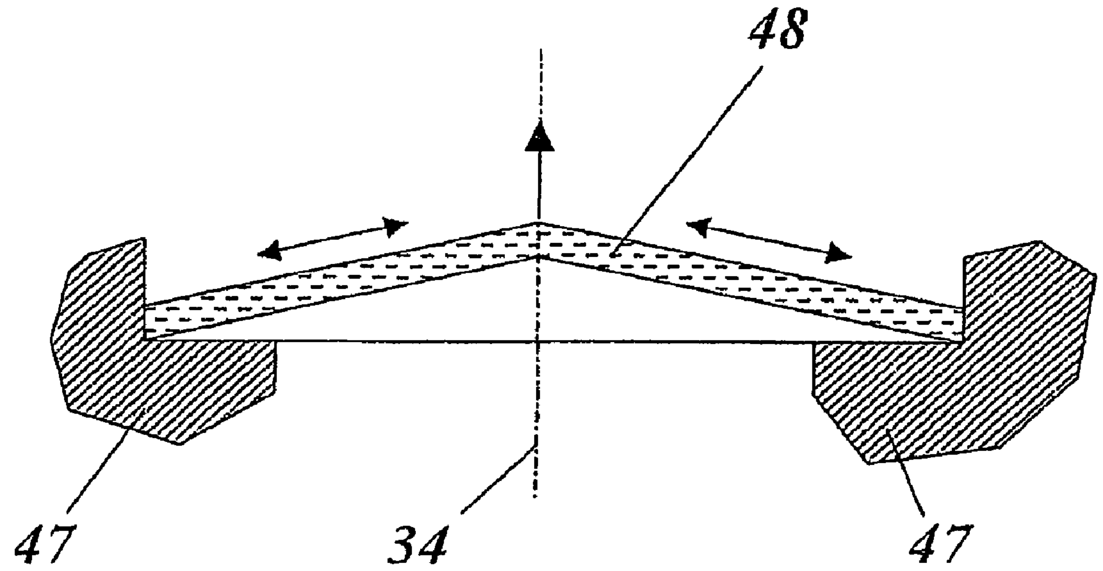
FIG. 5 shows a cross section through an expansion body which, by virtue of its shape as a toggle lever, carries out an amplified thermal expansion movement on one axis.

It is also feasible within the scope of the invention, instead of using the flat expansion body 29 in the form of a circular disk as described above, to use an expansion body which carries out an amplified thermal expansion movement by virtue of its special shape or the fact that its material has an anisotropic behavior. One example of a specially shaped expansion body is shown in FIG. 5. The expansion body 48 in FIG. 5 uses the mechanical principle of a toggle lever by being formed either as a conically shaped disk or as a strip with a bend in the center. The outer edge of the expansion body 48 is supported on an opposing bearing 47. Thermal expansion as indicated by the double-headed arrows in FIG. 5 results, because of the special shaping, in a reverse toggle-lever effect, that is to say an amplified thermal expansion movement on the axis 34 (arrow), which can advantageously be used as a switching movement.

The invention claimed is:

1. An automatically quenching surge arrester arrangement comprising:

a surge arrester, which changes from a non-conductive state to a conductive state when a predetermined first voltage is exceeded and returns to the non-conductive state only when a substantially lower second voltage is undershot; and a switching mechanism, which responds when a current flows through the surge arrester and interrupts the current flow through the surge arrester, and then automatically returns to an initial state again, wherein the switching mechanism responds reversibly to heat which is produced by the current flow in the surge arrester, and has a switching means and an operating means which are thermally coupled to the surge arrester for operation of the switching means, the operating means responds reversibly to the heat which is produced by current flow in the surge arrester, and has expansion means which convert the heat produced by the current flow in the surge arrester to a switching movement by means of thermal expansion, and the expansion means have an expansion body composed of a solid material, whose thermal expansion on a first axis is used as the switching movement, the expansion body is composed of heat-resistant, rubber-elastic material and is surrounded by a limiting element, which limits a radial expansion, and thus amplifies an axial expansion.

2. The surge arrester arrangement as claimed in claim 1, wherein the expansion body is in the form of a circular disk which is axial with respect to the first axis, and a hollow-cylindrical, co-axial, electrically and thermally insulating insulator sleeve is provided as the limiting element.

3. The surge arrester arrangement as claimed in claim 1, wherein the switching means have a switch connected in series with the surge arrester, the switch is closed in the initial state, and opened when the operating means respond to heat which is produced by current flow in the surge arrester.

4. The surge arrester arrangement as claimed in claim 3, wherein the switch has two metallic contact elements, which are pressed against one another by a spring element and are separated from one another against a pressure of the spring element, one of the contact elements of the switch is connected to the surge arrester arrangement, and the operating means and/or the expansion means are/is arranged between the two contact elements.

5. The surge arrester arrangement as claimed in claim 4, wherein the contact elements are surface-treated.

6. The surge arrester arrangement as claimed in claim 4, wherein the surge arrester, the metallic contact elements, the spring element and the operating means and/or the expansion means are arranged one behind the other axially with respect to a first axis in a common housing, the housing is electrically conductive and is used as a supply line to the surge arrester, and contact springs are provided in order to produce the contact with the housing.

7. The surge arrester arrangement as claimed in claim 6, wherein the metallic contact elements, the spring element and the operating means and/or the expansion means are arranged on one side of the surge arrester.

8. The surge arrester arrangement as claimed in claim 6, wherein the housing is in the form of a housing which is open on one side and can be screwed in place.

9. The surge arrester arrangement as claimed in claim 6, wherein the metallic contact elements and the operating means and/or the expansion means are arranged on one side of the surge arrester, and the spring element is arranged on the other side of the surge arrester.

10. The surge arrester arrangement as claimed in claim 6, wherein connecting means for connection of the surge arrester arrangement in a circuit are provided on the housing.

11. The surge arrester arrangement as claimed in claim 4, wherein the spring element is a spring washer.

12. The surge arrester arrangement as claimed in claim 1, wherein the surge arrester is a gas capsule arrester and has a cylindrical shape with electrical connections arranged on the end faces.

13. The surge arrester arrangement as claimed in claim 1, wherein thermal expansion of the expansion body on the first axis is amplified by suitable shaping of the expansion body.

14. The surge arrester arrangement as claimed in claim 1, wherein thermal expansion of the expansion body on the first axis is amplified by the expansion body material having an anisotropic behavior.

15. The surge arrester arrangement as claimed in claim 1, wherein the heat resistant rubber elastic material is a silicone rubber, a fluoroelastomer or any combination thereof.

16. The surge arrester arrangement as claimed in claim 2, wherein the insulator sleeve is composed of polytetrafluoroethylene.

17. The surge arrester arrangement as claimed in claim 5, wherein the contact elements are coated with silver.

18. A coaxial conductor arrangement comprising:

a surge arrester arrangement as claimed in claim 1 with a housing, the surge arrester arrangement mounted with a first axis at right angle to a second axis on the coaxial conductor arrangement;

an inner conductor which runs on the second axis; and an outer conductor which coaxially surrounds the inner conductor, wherein the housing of the surge arrester is electrically conductively connected to the outer conductor, and a supply line to the surge arrester is electrically conductively connected to the inner conductor.

19. An automatically quenching surge arrester arrangement comprising:

a surge arrester, which changes from a non-conductive state to a conductive state when a predetermined first voltage is exceeded and returns to the non-conductive state only when a substantially lower second voltage is undershot; and a switching mechanism, which responds when a current flows through the surge arrester and interrupts the current flow through the surge arrester, and then automatically returns to an initial state again, wherein the switching mechanism responds reversibly to heat which is produced by the current flow in the surge arrester, and has a switching means and an operating means which are thermally coupled to the surge arrester for operation of the switching means, the operating means responds reversibly to the heat which is produced by current flow in the surge arrester, and has expansion means which convert the heat produced by the current flow in the surge arrester to a switching movement by means of thermal expansion, and the expansion means are in the form of a gas or a liquid whose thermal expansion is used to produce a switching movement.

* * * * *

UNITED STATES PATENT AND TRADEMARK OFFICE

CERTIFICATE OF CORRECTION

PATENT NO. : 7,567,417 B2
APPLICATION NO. : 11/659521
DATED : July 28, 2009
INVENTOR(S) : Groth et al.

It is certified that error appears in the above-identified patent and that said Letters Patent is hereby corrected as shown below:

Title Page, Item (56) References Cited, U.S PATENT DOCUMENTS, add the following:

-- 5,724,220 3/1998 Chaudhry............................361/119 --

Signed and Sealed this

First Day of December, 2009

David J. Kappos

David J. Kappos
*Director of the United States Patent and Trademark Office*